United States Patent [19]

Bury

[11] Patent Number: 5,321,894
[45] Date of Patent: Jun. 21, 1994

[54] MAPPING A SURFACE OF A WORKPIECE

[75] Inventor: Duncan R. Bury, Rugby, England

[73] Assignee: T & N Technology Limited, Rugby, United Kingdom

[21] Appl. No.: 853,071

[22] Filed: Mar. 17, 1992

[30] Foreign Application Priority Data

Apr. 13, 1991 [GB] United Kingdom ................. 9107890

[51] Int. Cl.⁵ .......................... G01B 5/20; G01B 11/24
[52] U.S. Cl. .......................................... 33/553; 33/551
[58] Field of Search ................ 33/551, 553, 554, 546, 33/552

[56] References Cited

U.S. PATENT DOCUMENTS

| 3,501,841 | 3/1970 | Adams | 33/546 |
| 4,377,911 | 3/1983 | Iida et al. | 33/558.04 |
| 4,516,326 | 5/1985 | Calcagno, Jr. | 33/558 |
| 4,662,074 | 5/1987 | Knapp et al. | 33/551 |
| 4,679,331 | 7/1987 | Koontz | 33/551 |

FOREIGN PATENT DOCUMENTS

| 0254515 | 1/1988 | European Pat. Off. . |
| 0347739 | 12/1989 | European Pat. Off. . |
| 0249554 | 12/1985 | Japan | 33/551 |
| 2009409 | 6/1979 | United Kingdom . |
| WO92/06350 | 4/1992 | World Int. Prop. O. . |

OTHER PUBLICATIONS

Patent Abstracts of Japan vol. 9, No. 62 (P-342) (1785) Mar. 1985 & JP-A-59 196 405 Nov. 1984.
J. of Physics E. Scientific Instruments vol. 9, No. 10, Oct. 1976 Ishing Bristol GB pp. 855-861 Sayles et al "Mapping A Small Area of a Surface".

Primary Examiner—Thomas B. Will
Attorney, Agent, or Firm—Nixon & Vanderhye

[57] ABSTRACT

The roughness of an area of the surface of a workpiece (W) is measured by bringing a height measuring device (10) to points on the surface and using the device to measure the height of each point relative to a datum level defined by a skid (17) while the device (10) is stationary relative to the surface. The points are arranged in a repetitive pattern in two dimensions across the area. The movement between the points is brought about by orthogonally arranged stepping motors (20,22).

8 Claims, 1 Drawing Sheet

MAPPING A SURFACE OF A WORKPIECE

BACKGROUND TO THE INVENTION

This invention is concerned with mapping a surface of a workpiece, e.g. to measure the roughness of an area of the surface of a workpiece. A knowledge of such roughness may be required in testing whether a workpiece has been manufactured correctly or in studying the effects of wear on a component.

Present methods of mapping involve the use of a height measuring device in the form of a stylus mounted on a pivoted arm. The stylus rests on the surface and the angle of the arm about its pivot point indicates the height of the particular point on which the stylus rests relative to a datum level. A linear motor is used to draw the stylus along a line within said area and an electrical signal representing the path followed by the stylus is recorded. This signal is an analogue of the heights of the surface along said line. While this analogue gives a reasonable indication of the roughness of the surface along said line, it gives no information about the roughness of the surface at right angles to said line and so can give a false impression of a surface. Information, which is hereinafter referred to as "three-dimensional information", about the height variation of a surface over an area rather than along a line, is necessary where it is important that a surface has equal roughness in all directions or where a specified differential roughness in different directions is necessary.

By present methods, three-dimensional information is gathered by utilising the linear motor to draw the stylus along a plurality of parallel lines with relative motion of the component and the stylus perpendicular to said lines being caused between each operation of the linear motor. The plurality of analogue signals collected can then be processed to give a three-dimensional "picture" of the surface indicating its roughness over the area. Such a method is described in GB 2,009,409A which concerns an instrument which comprises a probe, means for oscillating the probe between a null position and contact with a workpiece, and means for moving the workpiece continuously to cause the probe to track across the workpiece surface. These methods are, however, limited in their accuracy by the inaccuracy of linear motors which cause an uncertainty in the beginning and end points of each line and a corresponding uncertainty in which points on the parallel lines are opposite one another. Furthermore, each point on a line is visited only once by a moving stylus which causes inaccuracy in the height indications, for example because the stylus may bounce. Furthermore, because of uncertainty in the position of the line investigated, such apparatus is unsuitable for investigating a surface before and after treatment or wear to investigate the effect of the treatment or the extent of the wear.

It is an object of the present invention to provide an improved method of mapping which provides better three-dimensional information.

BRIEF SUMMARY OF THE INVENTION

The invention provides a method of mapping an area of the surface of a workpiece, the method comprising the steps of:

(i) causing relative movement between the surface and a height measuring device operable to measure the height of a point on the surface relative to a datum level to bring the device into measuring relationship with a particular point on the surface and bringing the device to rest relative to the surface at the particular point, (ii) operating the device to measure the height of the particular point and recording said height, and (iii) repeating steps (i) and (ii) for a plurality of points within said area, the points being arranged in a repetitive pattern in two dimensions across said area.

In a method in accordance with the invention, the relationship of the points at which heights are measured is well-established so that information taken along a line in the area is of equal validity to information taken along a line perpendicular to said line. Furthermore, because measurements are taken when the height measuring device is stationary relative to the surface, problems of bouncing are avoided and a plurality of measurements can be made at the same point.

The repetitive pattern may have the points arranged at the intersections of a grid, for example a rectangular grid.

The height measuring device may be of the type described above utilising a stylus or may be an optical device.

The relative movement between the height measuring device and the surface may be achieved by the use of two orthogonally arranged stepping motors.

The invention also provides apparatus for use in mapping an area of the surface of a workpiece, the apparatus comprising a height measuring device operable to measure the height of a point relative to a datum level, moving means operable to cause relative movement between the height measuring device and the surface to bring the device to a particular point on the surface and to bring the device to rest relative to the surface at the particular point, control means operable to control the moving means so that the height measuring device is brought in turn to a plurality of points within said area, said points being arranged in a repetitive pattern in two dimensions across said area, and the device is operated to measure the height of each of said points, and recording means operable to record the heights measured by the device.

BRIEF DESCRIPTION OF THE DRAWINGS

There now follows a detailed description, to be read with reference to the accompanying drawings, of a method and an apparatus which are illustrative of the invention.

In the drawings.

DETAILED DESCRIPTION OF PREFERRED EMBODIMENT OF THE INVENTION

Figure 1:
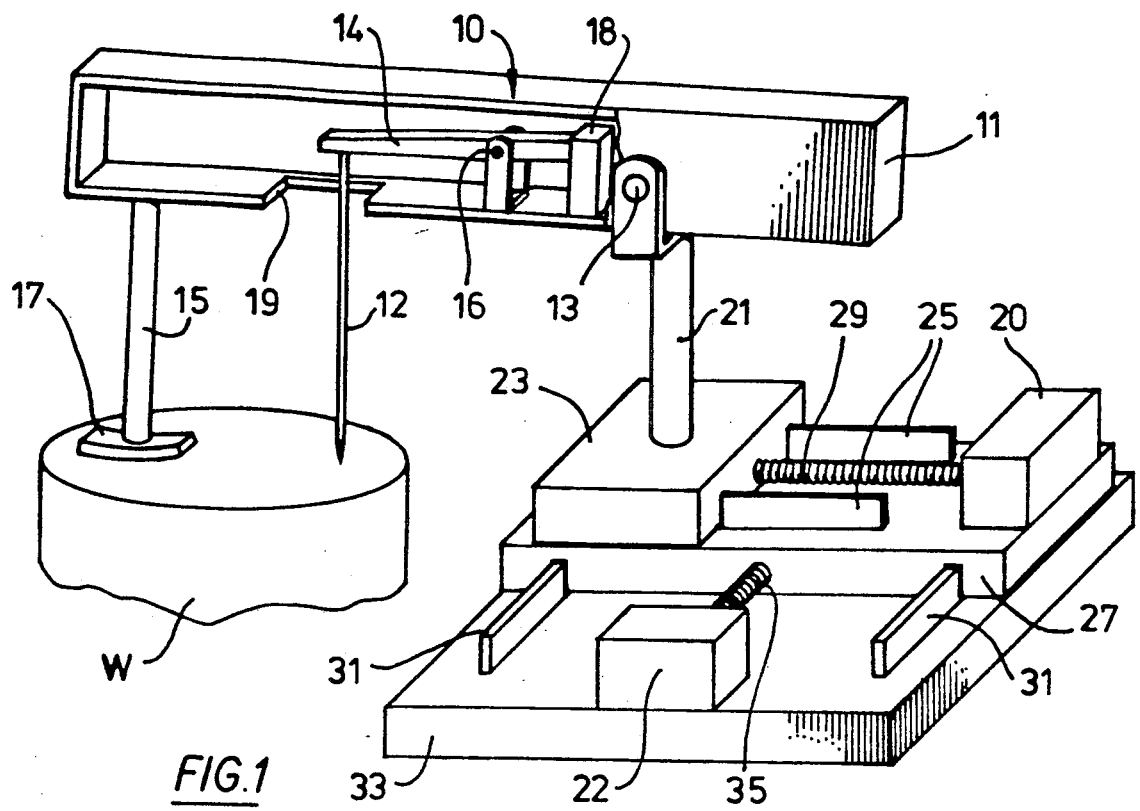
FIG. 1 is a diagrammatic perspective view with some parts broken away of the illustrative apparatus.
Figure 2:
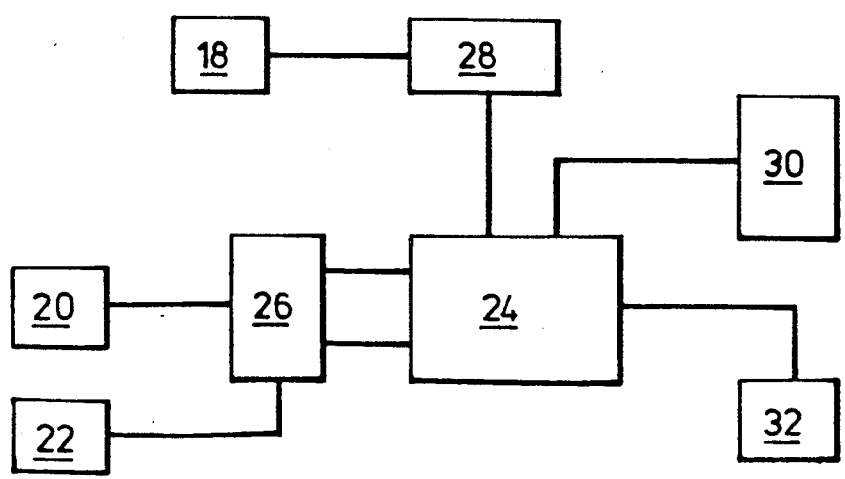
FIG. 2 is a diagrammatic view of the control circuitry of the illustrative apparatus.

The illustrative apparatus is for use in mapping an area of the surface of a workpiece W. The apparatus comprises a height measuring device 10 operable to measure the height of a point on the workpiece surface relative to a datum level. The height measuring device comprises a diamond stylus 12 having a radius of 5 microns, an arm 14 on which the stylus 12 is mounted, a pivot 16 on which the arm 14 pivots, and a transducer 18 arranged to produce a signal representing the angle of the arm 14 about the pivot 16 which itself is dependent upon the height of the stylus 12 above the datum level. Thus, when the stylus 12 rests on a point on the surface of the workpiece W, the transducer 18 produces a signal representing the height of the point on the surface. Specifically, the arm 14 is mounted on the pivot 16 within a hollow rectangular box 11 which is mounted on a pivot 13. A rod 15 depends from the box 11 and has a skid 17 mounted on the bottom end thereof. The skid 17 is arranged to rest on the surface of the workpiece W bearing on sufficient area that the height of the skid 17 represents an average height of the surface. The skid 17 supports the box 11 about its pivot 13 and thereby defines the datum level aforementioned, i.e. the transducer 18 measures relative to the box whose position provides the datum level.

The pivot 16 is supported within the box 11 and the stylus 12 projects downwardly through a hole 19 in the bottom of the box 11 to rest on the surface of the workpiece W. The transducer 18 is a linearly variable differential transformer arranged to detect the height of an end of the arm 14 above the bottom of the box 11. This height is directly proportional to the height of the surface of the workpiece W on which the stylus rests.

The illustrative apparatus also comprises moving means operable to cause relative movement between the height measuring device 10 and the surface of the workpiece W, the relative movement being in the plane of the workpiece, i.e. in a plane extending transversely of the stylus 12. The moving means, in this case, moves the device 10 while the workpiece W remains stationary but, in modifications of the illustrative apparatus, the relative movement could be achieved by moving the workpiece W or both the workpiece W and the device 10. The relative movement brings the device 10 to a particular point on the surface of the workpiece W within an area under investigation and brings the device 10 to rest relative to the surface at that point. The moving means comprises two orthogonally arranged stepper motors 20 and 22. These motors 20 and 22 have a minimum step size of 1 micron but in this case are used to move the device 10 through steps of 0.004mm over an area of 0.512mm square. Specifically, the pivot 13 is supported on a rod 21 which projects vertically upwards from a carriage 23. The carriage 23 is movable linearly along two parallel rails 25 mounted on a second carriage 27. This movement is achieved by means of a threaded shaft 29 received in a threaded passage in the carriage 23. The shaft 29 is driven by the motor 20 which is also mounted on the second carriage 27. The carriage 27 is movable along two parallel rails 31 which extend normally to the rails 25 and are mounted on a fixed base 33. The carriage 27 is movable by means of a threaded shaft 35 which is received in a threaded passage in the carriage 27. The shaft 35 is driven by the motor 22 which is also mounted on the base 33.

The illustrative apparatus also comprises control means in the form of a processor 24 which is operable to control the stepping motors 20 and 22 through a motor controller 26 so that the device 10 is brought in turn to a plurality of points within the area of the workpiece W under investigation and the device 10 is operated to measure the height of each point. In this case, 12 readings of the height are made at each point, the highest and lowest readings are discarded, and an average taken of the remaining 10 readings. The points are arranged in a repetitive pattern in two dimensions specifically at the intersections of a rectangular grid. The device 10 is first moved along a first line in the area to the points located along this line. When the heights of all the points along the first line have been measured, the motor 20 is operated to return the device 10 to its starting point and the motor 22 is operated to move the device 10 perpendicularly to the first line to position the device 10 at the beginning of a second line which is parallel to the first line. The motor 20 is then operated to bring the device 10 to each of the points which lie along the second line, and so on until the area has been covered. In this case, the grid is 128 steps in each direction so that 16384 heights are measured. The processor 24 receives the signals of the transducer 18 via an amplifier 28.

The illustrative apparatus also comprises recording means provided by a memory 30 which is operable to record the heights measured by the device 10. The 16384 heights are recorded in relation to the points to which they relate. The stored data for the area can be processed to generate images in plan view, e.g. in colours which vary according to the height, or in isometric projection. This data can be manipulated in any of the standard ways to give a measure of the roughness of the surface and passed to an output device 32, e.g. a colour printer.

In a modification of the illustrative apparatus, the pivot 13 is replaced by a fixed mounting and the rod 15 and skid 17 are omitted. In this case, the datum level is provided by the bottom of the box 11 which is at a constant vertical height.

The illustrative apparatus is used in the illustrative method of mapping the area of the surface of the workpiece W. The method comprises the steps of:

(i) operating one of the orthogonally arranged stepper motors 20 and 22, or both the motors 20 and 22, thereby causing relative movement between the surface and the device 10 to bring the device into measuring relationship with a particular point on the surface and bringing the device 10 to rest relative to the surface at the particular point, (ii) operating the device 10 to measure the height of the particular point and recording said height in the memory 30, and (iii) repeating steps (i) and (ii) for a plurality of points within the area, the points being arranged at the intersections of a rectangular grid, i.e. in a repetitive pattern in two dimensions across said area. As mentioned above, in the illustrative method, the device 10 is operated a plurality of times, viz. 12, at each point and an average of the values measured is recorded in the memory 30.

I claim:

1. A method of measuring the surface roughness of an area of the surface of a stationary workpiece by building up a three-dimensional representation thereof, the method comprising the steps of:

(i) defining a datum level of the surface of a stationary workpiece representing an average height of the surface by positioning a skid on the surface, the skid bearing on sufficient of the surface that the height of the skid represents the average height of the surface;

(ii) moving a height measuring device operable optically or by means of a stylus to measure the height of a point on the surface of the workpiece relative to the datum level to bring the device into measuring relationship with a particular point on the surface and bringing the device to rest relative to the surface at the particular point, said skid being moved with the height measuring device;

(iii) operating the height measuring device to measure the height of the particular point, and recording said height in a memory;

(iv) repeating steps (ii) and (iii) to measure a plurality of points within said area, the points being arranged in a repetitive pattern in two dimensions across said area; and (v) utilizing the heights recorded in said memory to form said representation.

2. The method according to claim 1, wherein the points are arranged at the intersections of a grid.

3. The method according to claim 1, wherein in step (iii), the height measuring device is operated a plurality of times at each point and an average of the values measured is recorded.

4. The method according to claim 1, wherein orthogonally arranged stepping motors are used to move the height measuring device and the skid.

5. The method according to claim 1, wherein the height measuring device comprises a stylus and a transducer operable to measure the height of the stylus relative to a datum level.

6. Apparatus for measuring the surface roughness of an area of the surface of a stationary workpiece, the apparatus comprising a skid arranged to bear on sufficient of the surface that the height of the skid represents the average height of the surface and thereby defines a datum level, a height measuring device operable optically or by means of a stylus to measure the height of a point relative to the datum level, moving means operable to move the skid across the surface and the height measuring device to bring the device to a particular point on the surface and to bring the device to rest relative to the surface at the particular point, control means operable to control the moving means so that the height measuring device is brought in turn to a plurality of points within said area, said points being arranged in a repetitive pattern in two dimensions across said area, and the device is operated to measure the height of each of said points, and recording means operable to record the heights measured by the device.

7. Apparatus according to claim 6, wherein the height measuring device comprises a stylus and a transducer operable to measure the height of the stylus relative to a datum level.

8. Apparatus according to claim 6, wherein the moving means comprises two orthogonally arranged stepping motors.

* * * * *